(12) United States Patent
Lee et al.

(10) Patent No.: US 8,704,973 B2
(45) Date of Patent: Apr. 22, 2014

(54) OPTICAL SHEET, BACKLIGHT UNIT AND LIQUID CRYSTAL DISPLAY DEVICE HAVING THE SAME

(75) Inventors: Man Hoan Lee, Seoul (KR); Jae Hyun Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 531 days.

(21) Appl. No.: 11/967,666

(22) Filed: Dec. 31, 2007

(65) Prior Publication Data

US 2009/0073344 A1 Mar. 19, 2009

(30) Foreign Application Priority Data

Sep. 19, 2007 (KR) .................. 10-2007-0095556

(51) Int. Cl.
G02F 1/1335 (2006.01)
G02B 5/04 (2006.01)
F21V 5/02 (2006.01)

(52) U.S. Cl.
USPC .............................. 349/64; 359/837; 362/339

(58) Field of Classification Search
USPC ................ 359/837; 362/339; 349/66, 62, 64
See application file for complete search history.

(56) References Cited

U.S. PATENT DOCUMENTS

| | | | |
|---|---|---|---|
| 6,239,851 B1 | 5/2001 | Hatazawa et al. | |
| 2002/0080598 A1* | 6/2002 | Parker et al. | 362/31 |
| 2005/0206805 A1* | 9/2005 | Lee et al. | 349/64 |
| 2005/0275767 A1 | 12/2005 | Huang et al. | |
| 2007/0263139 A1* | 11/2007 | Hwang et al. | 349/96 |

FOREIGN PATENT DOCUMENTS

| | | |
|---|---|---|
| CN | 1892259 | 1/2007 |
| JP | 2005-107095 | 4/2005 |
| KR | 1020010050581 A | 6/2001 |
| KR | 1020040061229 A | 7/2004 |
| KR | 100613839 B1 | 8/2006 |
| KR | 1020060116068 A | 11/2006 |

OTHER PUBLICATIONS

Office Action issued in corresponding Chinese Patent Application No. 2007103065553.X; issued Nov. 27, 2009.
Office Action issued in corresponding Chinese Patent Application No. 200710306553.X, mailed Jul. 25, 2011.
Office Action issued in corresponding Korean Patent Application No. 10-2007-0095556, mailed Jan. 25, 2013.

* cited by examiner

*Primary Examiner* — Edward Glick
*Assistant Examiner* — Dennis Y Kim
(74) *Attorney, Agent, or Firm* — Brinks Gilson & Lione

(57) ABSTRACT

Provided are an optical sheet, a backlight unit and an LCD device having the same. The backlight unit includes a first layer, a second layer, and a refractive pattern. The first layer has a larger refractivity than an air layer, and the second layer has a larger refractivity than the first layer. The refractive pattern is disposed at a boundary surface between the first layer and the second layer and has ridges and furrows that change a traveling path of light. The optical sheet refracts light at least three times to condense the light in a direction perpendicular to a light-exiting surface.

17 Claims, 6 Drawing Sheets

OPTICAL SHEET, BACKLIGHT UNIT AND LIQUID CRYSTAL DISPLAY DEVICE HAVING THE SAME

CROSS REFERENCE TO RELATED APPLICATIONS

The present application claims priority under 35 U.S.C. 119 and 35 U.S.C. 365 to Korean Patent Application No. 10-2007-0095556 (filed on Sep. 19, 2007), which is hereby incorporated by reference in its entirety.

BACKGROUND

The present disclosure relates to an optical sheet.

Cathode ray tubes (CRTs) are used in larger electronic devices, such as televisions, monitors for measuring devices, and other information terminals. However, the innate weight and size of CRTs are incompatible with smaller electronic devices.

Typically, liquid crystal display (LCD) devices are lighter, thinner, and smaller than CRTs. A LCD generally consumes less power than CRTs. Thin-film transistor (TFT) LCD devices may provide full color, high resolution, and a large display screen size. Accordingly, TFT LCD devices are used in a wide range of electronic devices, such as laptop computers and monitors.

A typical LCD device is a light-receiving display device that displays an image. The LCD device uses a change in an optical characteristic of a liquid crystal cell, such as birefringence, optical rotatory power, dichroism, and light scattering, by applying a voltage to the liquid crystal.

Because the LCD device is a light-receiving device, it includes a backlight unit providing light to display an image.

The backlight unit may be a direct type backlight unit or an edge-type backlight unit depending on the location of a light source. A direct-type backlight unit uses a plurality of light sources that are disposed at regular intervals under the LCD panel to directly provide light to an LCD panel. An edge-type backlight unit uses a light guide plate that converts light emitted from a light source into surface light to provide light to an LCD panel.

The backlight unit uses optical sheets, such as a diffusion sheet and a prism sheet, to enhance the optical characteristics (e.g., brightness uniformity and front brightness) of light emitted from the light source.

An LCD device with an optical sheet may have an optical loss that degrades the optical efficiency of the LCD device.

A prism sheet includes ridges and furrows. A non-uniform brightness may be caused by abrasion of the ridges due to friction with a light guide plate or other sheets.

SUMMARY

The present embodiments may obviate one or more of the limitations or drawbacks inherent in the related art. For example, in one embodiment, an optical sheet minimizes an optical loss. In another example, a backlight unit provides a uniform brightness.

Additional advantages, objects, and features of the present embodiments will be set forth in part in the description which follows and in part will become apparent to those having ordinary skill in the art upon examination of the following or may be learned from practice of the present embodiments.

In one embodiment, an optical sheet includes: a first layer, a second layer, and a refractive pattern. The first layer includes a larger refractivity than air. The second layer includes a larger refractivity than the first layer. The refractive pattern is disposed at a boundary surface between the first layer and the second layer and includes ridges and furrows that change a traveling path of light. The optical sheet refracts light at least three times to condense the light in a direction perpendicular to a light-exiting surface.

In another embodiment, a backlight unit includes: a light source emitting light; and an optical sheet condensing/diffusing light emitted from the light source.

In another embodiment, an LCD device includes: a light source that emits light; an optical sheet that condenses the emitted light by refracting the emitted light at least three times; and a LCD panel displaying an image using light received from the optical sheet.

It is to be understood that both the foregoing general description and the following detailed description of the present embodiments are exemplary and explanatory, and are intended to provide further explanation of the invention as claimed.

BRIEF DESCRIPTION OF THE DRAWINGS

The accompanying drawings, which are included to provide a further understanding of the present embodiments and are incorporated in and constitute a part of this application, illustrate embodiment(s) and together with the description serve to explain the principle of the present embodiments.

DETAILED DESCRIPTION OF THE EMBODIMENTS

Figure 1:
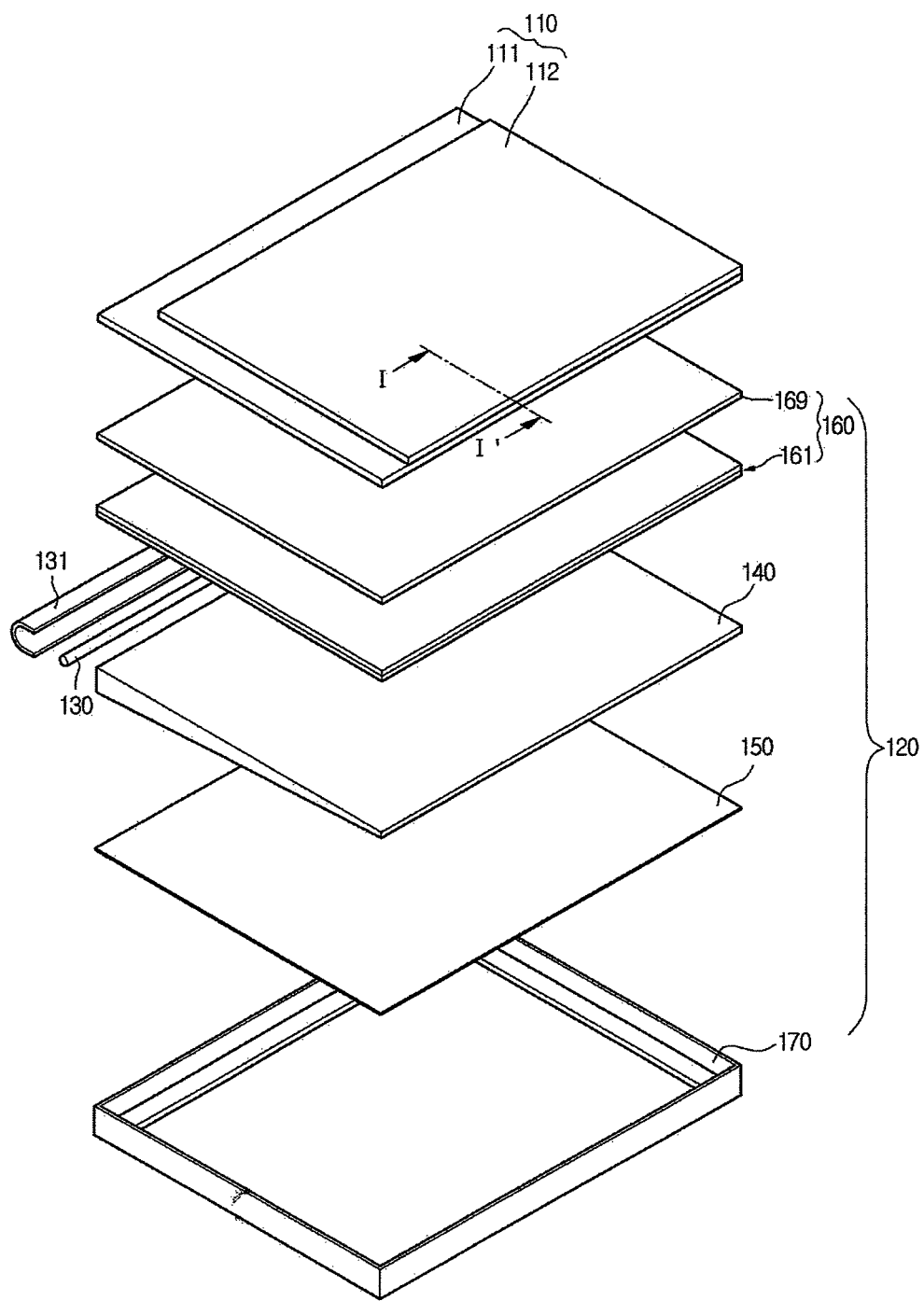
FIG. 1 is an exploded perspective view of an LCD device having an optical sheet according to a first embodiment.
Figure 2:
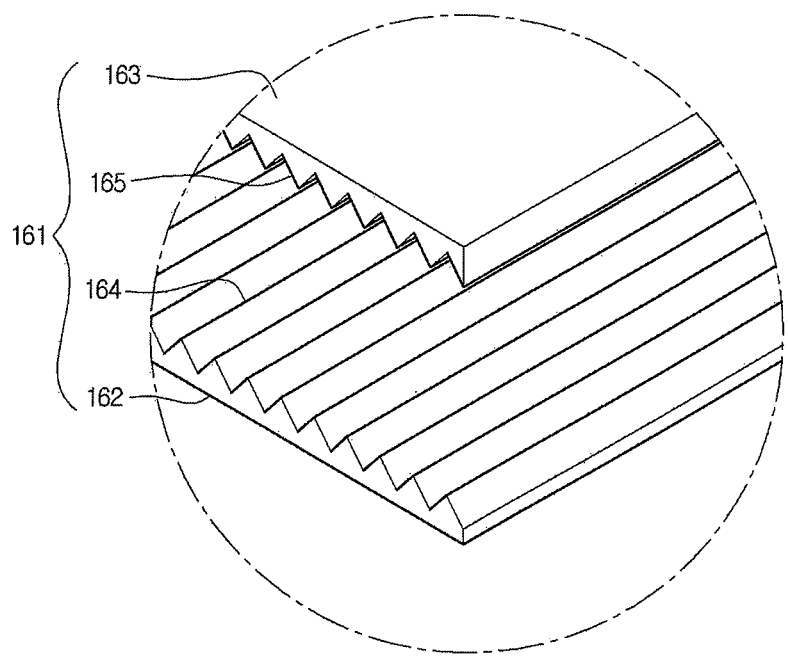
FIG. 2 is a detailed view of a light-condensing sheet of FIG. 1.
Figure 3:
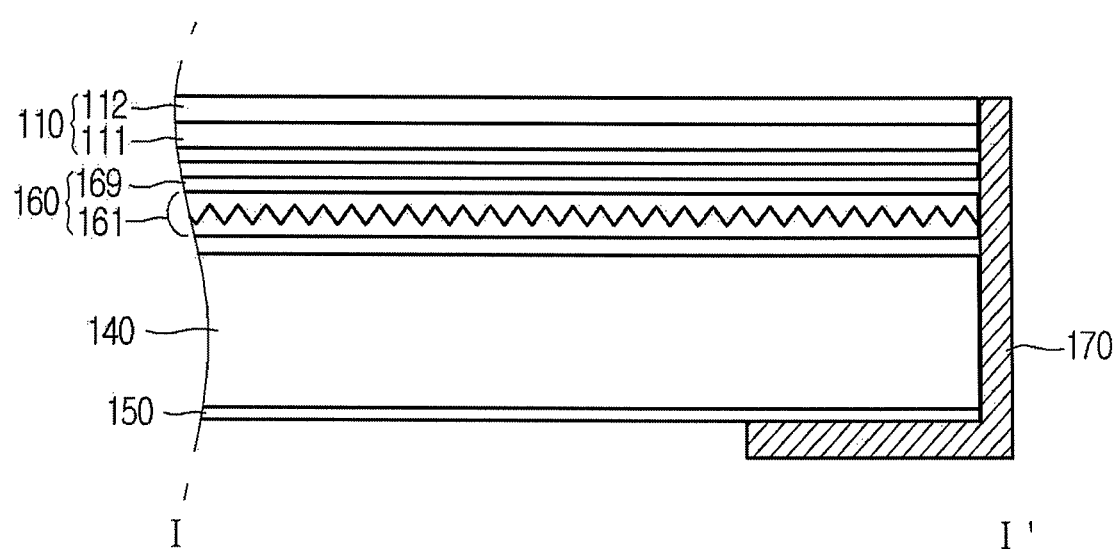
FIG. 3 is a sectional view of the LCD device taken along a line I-I' of FIG. 1.

In a first embodiment, as shown in FIGS. 1 to 3, an LCD device includes an LCD panel 110 and a backlight unit 120. Additional, different, or fewer components may be included. The LCD panel 110 displays an image. The backlight unit 120 is disposed on a rear side of the LCD panel 110 to provide light to the LCD panel 110.

The LCD panel 110 includes an array substrate 111 and a color filter substrate 112 that are attached together with a liquid crystal layer interposed therebetween.

The array substrate 111 may include a plurality of gate lines and a plurality of data lines that intersect each other to define pixels. Thin film transistors (TFTs) are disposed at the respective intersections between the gate lines and the data lines. The TFTs may be connected in a one-to-one correspondence to pixel electrodes in the respective pixels.

The color filter substrate 112 may include red/green/blue (R/G/B) color filters corresponding to the respective pixels, a black matrix that encloses the respective filters and covers the gate lines, the data lines and the TFTs, and a common electrode. The common electrode may cover all or a portion of the R/G/B color filters and the black matrix.

An LCD panel driver includes a driving circuit. The driving circuit provides a driving signal to the LCD panel 110. The LCD panel driver may be electrically connected to one or more sides of the LCD panel 110 by a tape carrier package (TCP) tap.

The LCD panel driver may provide a control signal and/or a data signal to the gate lines and the data lines of the LCD panel 110, thereby driving the pixels of the LCD panel 110.

To display an image, the LCD panel 110 transmits or blocks light for each pixel. The liquid crystal of the LCD panel 110 is rotated by a dielectric anisotropy according to an electric field between the common electrode and the pixel electrode when a voltage of the data signal applied to the pixel electrode is controlled with a voltage applied to the common electrode.

The backlight unit 120 may include a light source 130, a light guide plate 140, a light source housing 131, an optical sheet 160, and a reflection sheet 150. Additional, different, or fewer components may be included. For example, the backlight unit 120 may include a rectangular-frame-shaped support main 170 for uniting (connecting) the light source 130, the light source housing 131, the light guide plate 140, the optical sheet 160, and the reflection sheet 150 into one module.

In one embodiment, the light source 130 is disposed at one side of the backlight unit 120 and emits light. The light guide plate 140 is disposed in line with the light source 130 to convert light received from the light source 130 into surface light. The light source housing 131 covers the light source 130 and guides light to the light guide plate 140. The optical sheet 160 is disposed on the light guide plate 140 to condense and/or diffuse light. The reflection sheet 150 is disposed on a rear side of the light guide plate 140 to reflect light, which exits through the rear side of the light guide plate 140, to the LCD panel 110.

The light source 130 emits light. The light source 130 may be a lamp or any now known or later developed light source that emits light.

The light source 130 is electrically connected to an inverter. The light source 130 may receive a driving voltage from the inverter. The inverter converts an external voltage into a driving voltage of a predetermined level and provides the driving voltage to the light source 130 to drive the light source 130.

The light source housing 131 protects the light source 130. The inside of the light source housing 131 may be coated with an optical refractive material to minimize the loss of light emitted from the light source 130.

The light emitted from the light source 130 enters the light guide plate 140. The light guide plate 140 may include polymethylmethacrylate (PMMA) or other materials. The light entering the light guide plate 140 may be uniformly diffused. The light may exit the light guide plate 140 toward the optical sheet 160. A portion of the light entering the light guide plate 140 may exit toward the reflection sheet 150, which is disposed under the light guide plate 140. The reflection sheet 150 may reflect light exiting the light guide plate 140 to minimize an optical loss.

In one embodiment, the optical sheet 160 includes a light-condensing sheet 161 and a diffusion sheet 169. Additional, different, or fewer components may be included. The light-condensing sheet 161 may condense light exiting the light guide plate 140. The diffusion sheet 169 may diffuse the condensed light.

The light-condensing sheet 161 may include a first layer 162 and a second layer 163 that have different refractive indexes. Layers of different refractive indexes may be united into the light-condensing sheet 161.

The first layer 162 and the second layer 163 may have a refractivity of about 1.3 to about 2.0. For example, the first layer 162 may have a refractivity of about 1.3 to about 1.9 and the second layer 163 may have a refractivity of about 1.4 to about 2.0.

In one embodiment, the first layer 162 has a smaller reflectivity than the second layer 163. The first layer 162 adjacent to a light-incidence surface has a smaller reflectivity than the second layer 163 confronting (faces) the light-incidence surface. For example, the first layer 162 may be disposed between the light-incidence surface and the second layer 163.

The first layer 162 may include a first prism pattern 164. The first prism pattern may be disposed on a surface of the first layer 162. The first prism pattern may have ridges and furrows (valleys).

The second layer 163 may include a second prism pattern. The second prism pattern 165 may be disposed on a surface of the second layer 163 that confronts the first prism pattern 164, such that the second prism pattern 165 faces the first prism pattern 164.

An air layer may be disposed between the light guide plate 140 and the first layer 162. The light exiting the light guide plate 140 enters the first layer 162 through the air layer. The light exiting the first layer 162 enters the second layer 163.

The air layer has a refractivity of 1. The light, which travels from light guide plate 140 to the second layer 163, travels in a refractivity-increasing direction through the air layer, the first layer 162 and the second layer 163.

The light-condensing sheet 161 may condense light because the refractivity of the first and second layers 162 increases along the light traveling direction. The first and second prism patterns 164 and 165 are disposed between the first and second layers 162 and 163 to change the light traveling path, which may maximize the condensation of light.

The light-condensing sheet 161 may increase an optical efficiency and/or reduce a defect caused by the abrasion of the prism ridges.

A light-condensing sheet 161 may include first and second layers 162 and 163 that have different refractive indexes. For example, the first layer 162 is formed of an acryl resin with a refractivity of 1.5. The second layer 162 is formed of an acryl resin with a refractivity of 1.63.

The light exiting the light guide plate 140 enters the first layer 162 with a refractivity of 1.5 through the air layer with a refractivity of 1. The light exiting the first layer 162 enters the second layer 163 with a refractivity of 1.63.

A first prism pattern 164 having ridges and furrows (valleys) is disposed on a front surface of the first layer 162 confronting the second layer 163. A second prism pattern 165 is disposed on a rear surface of the second layer 163 confronting the first prism pattern 164 in such a way that it faces the first prism pattern 164. In FIG. 2, the front surface of the first and second layer 162 and 163 is the surface closest to the LCD panel 110. In FIG. 2, the rear surface of the first and second layer 162 and 163 is the surface furthest from the LCD panel 110. For example, the first layer 162 has a front surface, which has ridges and furrows, and a rear surface that is closer to the light guide plate 140.

Figure 4:
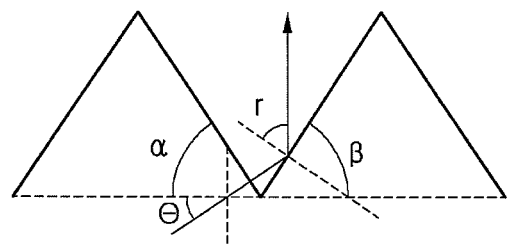
FIG. 4 is a diagram illustrating the propagation of light entering a light-condensing sheet of FIG. 3, depending on an incident angle of the light.

As shown in FIG. 4, the light exiting the light guide plate 140 has an incident angle θ from the air layer to the first layer 162. The first and second tilt angles α and β of the first and second prism patterns 164 and 165 changes depending on the incident angle θ to adjust an exiting angle τ. The first and second tilt angles α and β of the first and second prism patterns 164 and 165 may change depending on the incident angle θ.

With respect to FIGS. 5-7, an operation of the light-condensing sheet 161 will be described.

The light-condensing sheet 161 may condense incident light according to Snell's law expressed as Equation (1) below.

$$n2/n1 = \sin\theta2/\sin\theta1 \qquad \text{Equation (1)}$$

In Equation (1), n1 denotes the refractivity of the first layer 162 and n2 denotes the refractivity of the second layer 163.

According to Snell's law, light is condensed due to decreasing dispersion when it propagates from a small-refractivity medium to a large-refractivity medium.

Figure 5:
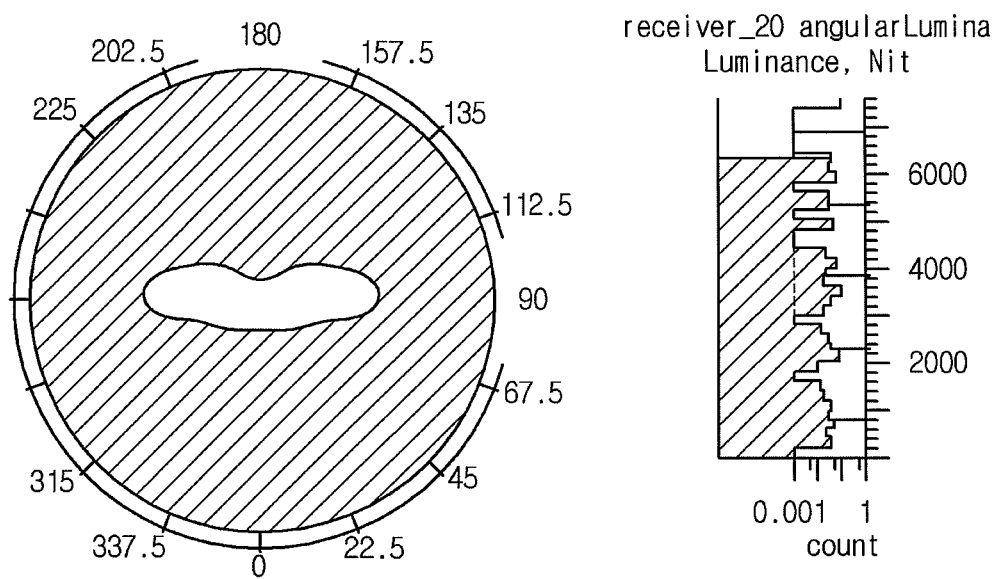
FIG. 5 is a diagram illustrating the distribution of light exiting the light-condensing sheet of FIG. 1.
Figure 6:
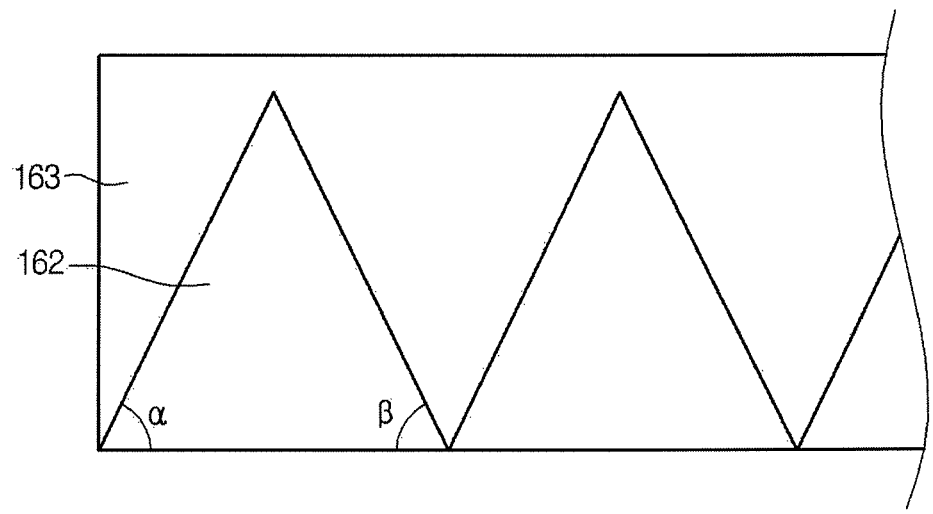
FIG. 6 is a sectional view of a light-condensing sheet of FIG. 4.

As shown in FIG. 5, the distribution of light exiting the light-condensing sheet 161 has a peak value "6000 nit" that is larger by "1000 nit" than a peak value "5000 nit" of that of the related art prism sheet or reverse prism sheet.

The light-condensing sheet according to one embodiment will be described with reference to FIG. 6, FIG. 7 and Table 1. Table 1 shows one optimal optical design that depends on a refractive difference Δn between the first and second layers 162 and 163 and first and second tilt angles α and β of a boundary surface between the first and second layers 162 and 163 with respect to the bottom surface of the first layer 162.

TABLE 1

| First layer (Refractivity) | Second layer (Refractivity) | Δn | α | β | Vertical luminance |
|---|---|---|---|---|---|
| 1.48 | 1.61 | 0.13 | 69° | 67° | 4693 nit |
| 1.47 | 1.61 | 0.14 | 69° | 65° | 5380 nit |
| 1.46 | 1.61 | 0.15 | 69° | 69° | 5567 nit |
| 1.46 | 1.61 | 0.16 | 68° | 68° | 6110 nit |
| 1.44 | 1.61 | 0.17 | 68° | 68° | 6499 nit |

In Table 1, the first and second tilt angles α and β and the refractive difference Δn between the first and second layers 162 and 163 are designed based on the case where the light exiting the light guide plate has an exiting angle of 72°. For example, the light guide plate has an exiting angle of 72° when most of the light exiting the light guide plate has an exiting angle of 72° with respect to the top surface of the light guide plate.

The first layer 162 adjacent to the light guide plate 140 has a smaller refractivity than the second layer 163, which is disposed over the first layer 162. The light-condensing sheet refracts light at least three times to condense the light toward the LCD panel. The light exiting the light guide plate 140 is reflected one time while entering the first layer 162. The light entering the first layer 162 is refracted one time at a boundary surface between the first and second layers 162 and 163 while entering the second layer 163. The light entering the second layer 163 is reflected one time at a boundary surface between the first and second layers 162 and 163. The light then travels toward the top surface of the second layer 163.

The refractive indexes of the first and second layers 162 and 163 and the first and second tilt angles α and β, which are shown in Table 1, are one embodiment for optimizing the condensing efficiency of the light-condensing sheet. The refractive indexes of the first and second layers 162 and 163 may change and the first and second tilt angles α and β may change accordingly.

Figure 7:
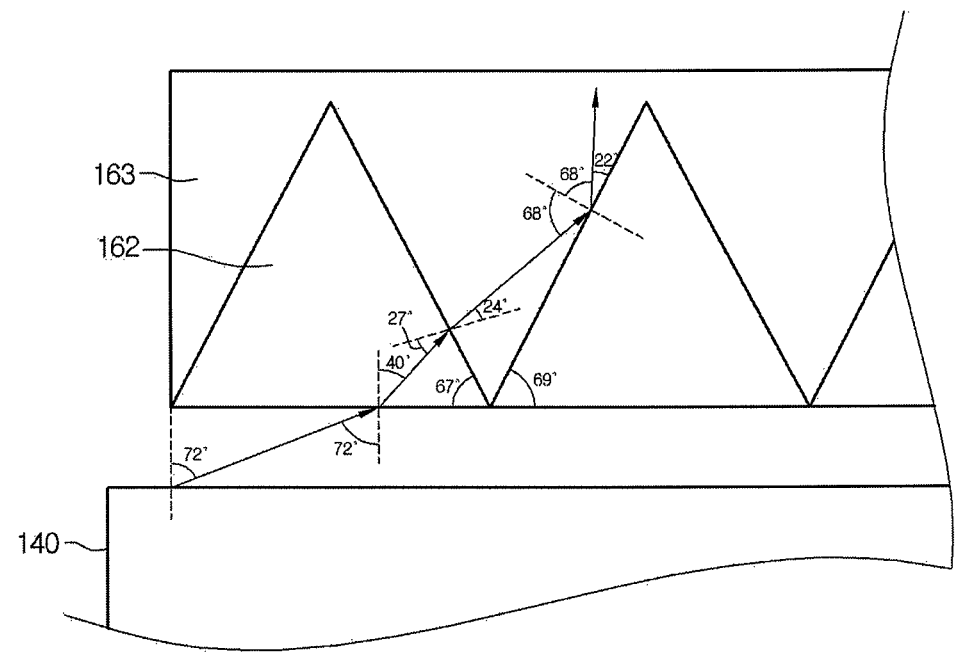
FIG. 7 is a diagram illustrating the propagation of light depending on a tilt angle of a pattern and a refractive difference between first and second layers of the light-collecting sheet of FIG. 4.

As shown in FIG. 7, the first layer 162 has a refractivity of 1.48. The second layer 162 has a refractivity of 1.61. The first tilt angle is 69°. The second tilt angle is 67°.

Light (denoted by an arrow) having a peak of 72° with respect to the top surface of the light guide plate 140 enters the first layer 162. According to Snell's law, the light entering the first layer 162 is refracted by 40° with respect to the dotted line perpendicular to the bottom surface of the first layer 162.

The light entering the first layer 162 travels toward the second layer 163. The light entering the second layer 163 is refracted by 24° with respect to a dotted line perpendicular to a 67° tilt surface, i.e., a boundary surface between the first and second layers 162 and 163.

The light having entered the second layer 163 is reflected from a 69° tilt surface, i.e., another boundary surface between the first and second layers 162 and 163, and then travels toward the top surface of the second layer 163. Accordingly, the light-condensing sheet 161 can condense light perpendicularly with respect to the top surface of the second layer 163.

Figure 8:
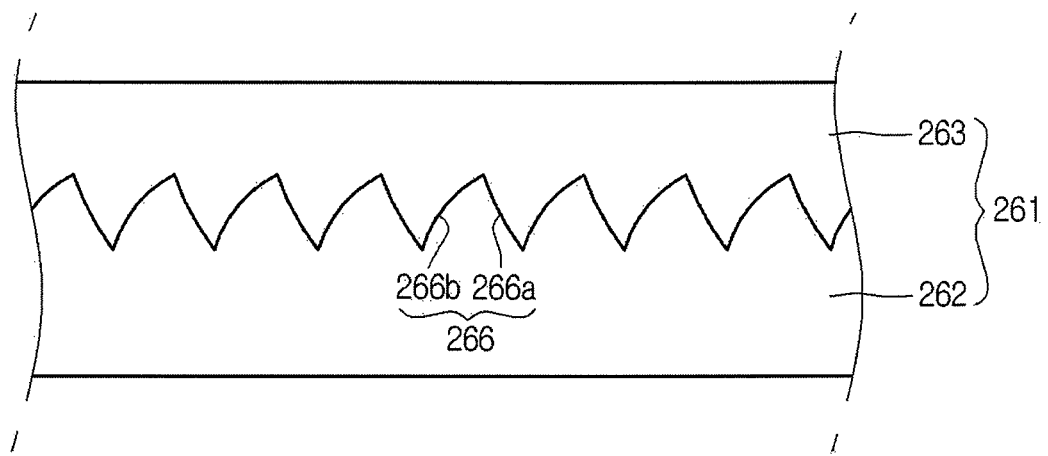
FIG. 8 is a sectional view of a light-condensing sheet according to a second embodiment.

In a second embodiment, as shown in FIG. 8, a light-condensing sheet 261 includes first and second layers 262 and 263 that have different refractive indexes. Additional, different, or fewer components may be included.

The second layer 263 may have a larger refractivity than the first layer 262 in order to condense light.

A refractive pattern 266 is disposed on the facing surfaces of the first and second layers 262 and 263. The refractive pattern 266 may extend throughout the entire boundary surface between the first and second layers 262 and 263 and has ridges and furrows that are arranged successively at regular intervals. A ridge of the refractive pattern 266 has an inclined side 266a and a rounded side 266b.

The light entering from the first layer 262 may be condensed because its traveling path changes while traveling through the refractive pattern 266 and the second layer 263.

Figure 9:
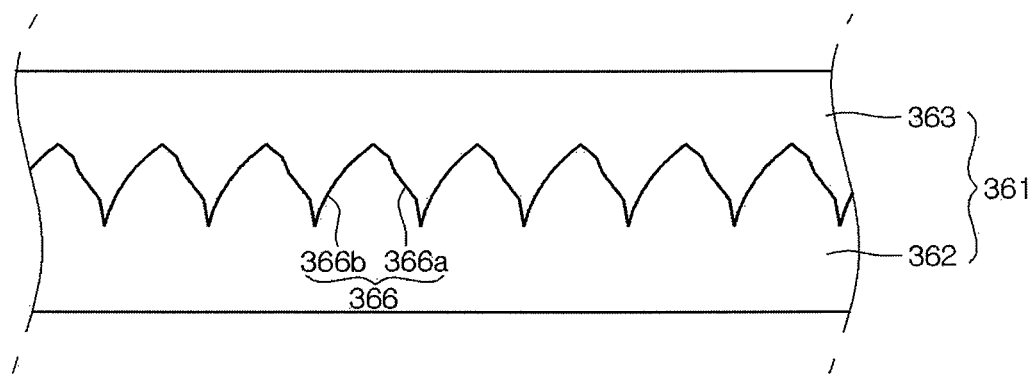
FIG. 9 is a sectional view of a light-condensing sheet according to a third embodiment.

In a third embodiment, as shown in FIG. 9, a light-condensing sheet 361 includes first and second layers 362 and 363 that have different refractive indexes. Additional, different, or fewer components may be included. The second layer 363 may have a larger refractivity than the first layer 362 in order to condense light.

A refractive pattern 366 may be disposed on the facing surfaces of the first and second layers 362 and 363. The refractive pattern 366 may extend throughout the entire boundary surface between the first and second layers 362 and 363. The refractive pattern 366 may have ridges and furrows that are arranged successively at regular intervals.

A ridge of the refractive pattern 366 has a side 366a with at least two or more inclined surfaces and a rounded side 366b. Alternatively, the rounded side 366b may be a straight side, as shown in FIG. 4.

The refractive pattern 366 may maximize the condensing efficiency of light that exits onto the second layer 363.

Figure 10:
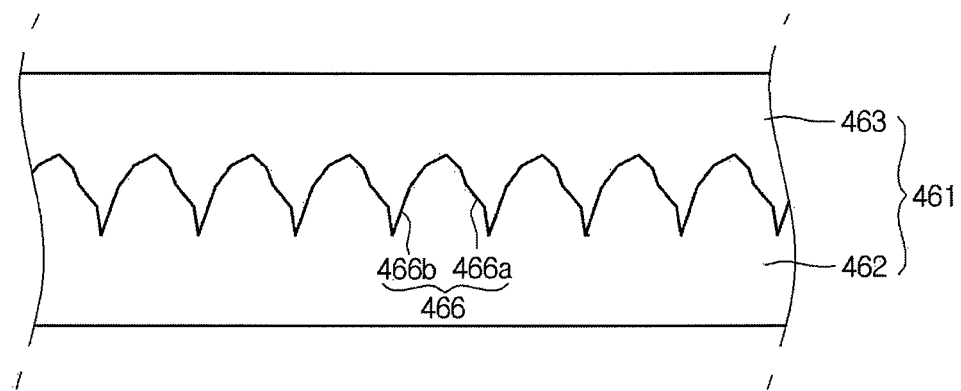
FIG. 10 is a sectional view of a light-condensing sheet according to a fourth embodiment.

In a fourth embodiment, as shown in FIG. 10, a light-condensing sheet 461 includes first and second layers 462 and 463 that have different refractive indexes. Additional, different, or fewer components may be included. The second layer 463 may have a larger refractivity than the first layer 462 in order to condense light.

A refractive pattern 466 may be disposed on the facing surfaces of the first and second layers 462 and 463. The refractive pattern 466 may extend throughout the entire boundary surface between the first and second layers 462 and 463. The refractive pattern 466 may have ridges and furrows that are arranged successively at regular intervals. Alternatively, the refractive pattern 466 may include other now known or latter developed refractive patterns.

A ridge of the refractive pattern 466 may include a first side 466a and a second side 466b. The first and second side 466a and 466b may include one or more inclined surfaces. For example, as shown in FIG. 10, the first side 466a may include at least two or more inclined surfaces and a second side 466b may include at least two or more inclined surfaces.

In one embodiment, as shown in FIG. 10, the first and second sides 466a and 466b are asymmetrical to each other. Alternatively, the first and second sides 466a and 466b are symmetrical to each other.

Figure 11:
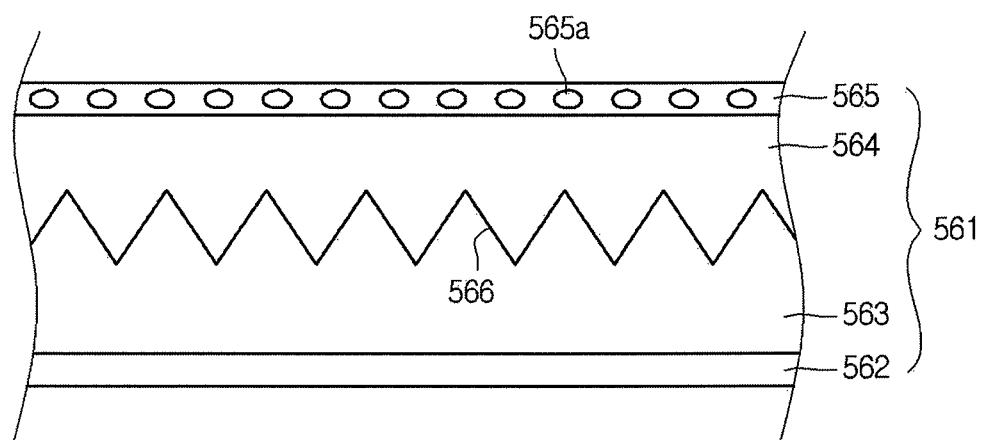
FIG. 11 is a sectional view of an optical sheet according to a fifth embodiment.

In a fifth embodiment, as shown in FIG. 11, an optical sheet 561 includes first, second and third layers 562, 563 and 564, which have different refractive indexes, and a diffusion layer 565.

The first, second and third second layers 562, 563 and 564 have an increasing refractivity in their order to condense light. For example, the first layer 562 has a lower refractivity than the second layer 563. The second layer 563 has a lower refractivity than the third layer 564. The light may be condensed because the refractivity of the first, second, and third layers 562, 563 and 564 increases along the light traveling direction.

A refractive pattern 566 may be disposed on the facing surfaces of the second and third layers 563 and 564.

The refractive pattern 566 may be disposed at a boundary surface between the second and third layers 563 and 564. Alternatively, the refractive pattern 566 may be disposed between other layers. For example, the refractive pattern 566 may be disposed at a boundary surface between the first and second layers 562 and 563.

In one embodiment, the diffusion layer 565 on the third layer 564 includes beads 565a. The beads 565a may diffuse/condense light exiting from the third layer 564. Alternatively, the diffusion layer 565 may include other diffusing material.

In the fifth embodiment, the optical sheet 561 includes the first, second and third layers 562, 563 and 564 for condensing light and the diffusion layer 565 for diffusing light.

The present embodiments are not limited to the above five embodiments. The present embodiments may be applied to any backlight unit and any LCD device that uses an optical sheet even when the size of an LCD device and the type (edge type or direct type) of a backlight unit change.

The present embodiments may enhance the optical efficiency in comparison with the related art prism sheet and reverse prism sheet and may prevent a defect that may be caused by the abrasion of the prism ridges of the related art prism sheet or reverse prism sheet.

The present may also unite two or more layers with different refractive indexes and a diffusion layer for diffusing light into one optical sheet, which may enhance the assemblability and the optical efficiency.

It will be apparent to those skilled in the art that various modifications and variations can be made in the present embodiments. It is intended that the present invention covers the modifications and variations of the present embodiments.

What is claimed is:

1. An optical sheet disposed above a light guide plate, the optical sheet comprising:
   a first layer having a larger refractivity than air;
   a second layer having a larger refractivity than the first layer;
   a refractive pattern disposed at a boundary surface between the first layer and the second layer, the refractive pattern having one or more ridges that change a traveling path of light;
   a third layer having a lower refractivity than the first layer; and
   a diffusion layer that diffuses light on the second layer,
   wherein the third layer is disposed at the lower surface of the first layer and facing the light guide plate,
   wherein the upper surface and the lower surface of the third layer is formed in a plate shape,
   wherein the optical sheet is operable to refract light from the light guide at least three times in a direction of the upper area of the optical sheet to a light-exiting surface,
   wherein the diffusion layer includes a plurality of beads,
   wherein the optical sheet includes the first, second and third layers for condensing light and the diffusion layer for diffusing light,
   wherein a boundary surface between the first layer and the third layer is not formed as a refractive pattern, and
   wherein the lower surface of the third layer is not formed as a refractive pattern.

2. The optical sheet according to claim 1, wherein light entering the second layer is directed at a boundary surface between the first layer and the second layer in the direction of the upper area of the optical sheet perpendicular to the light-exiting surface.

3. The optical sheet according to claim 1, wherein both the first layer and the second layer include a medium with a refractivity of about 1.3 to about 2.0.

4. The optical sheet according to claim 1, wherein the one or more ridges of the refractivity pattern include a first inclined side and a second rounded side.

5. The optical sheet according to claim 1, wherein the one or more ridges of the refractivity pattern include a first side with two or more inclined surfaces and a second rounded side.

6. The optical sheet according to claim 1, wherein the one or more ridges of the refractivity pattern include a first side with two or more inclined surfaces and a second side with two or more inclined surfaces.

7. The optical sheet according to claim 1, wherein the first, second and third layers condense light by first refracting the light from the light guide at the lower surface of the third layer, by second refracting the first-refracted light at the interface between the upper surface of the third layer and the lower surface of the first layer, and by third refracting the second-refracted light at the refractive pattern at the boundary surface between the first layer and the second layer.

8. A backlight unit comprising:
   a light source emitting light; and
   an optical sheet disposed above a light guide plate, the optical sheet comprising:
      a first layer having a larger refractivity than air;
      a second layer having a larger refractivity than the first layer; and
      a refractive pattern disposed at a boundary surface between the first layer and the second layer, the refractive pattern having one or more ridges that change a traveling path of light;
      a third layer having a lower refractivity than the first layer; and
      a diffusion layer that diffuses light on the second layer,
      wherein the third layer is disposed at the lower surface of the first layer and facing the light guide plate,
      wherein the upper surface and the lower surface of the third layer is formed in a plate shape, wherein the optical sheet is operable to refract light from the light guide at least three times in a direction of the upper area of the optical sheet to a light-exiting surface, wherein the diffusion layer includes a plurality of beads, wherein the optical sheet includes the first, second and third layers for condensing light and the diffusion layer for diffusing light, wherein a boundary surface between the first layer and the third layer is not formed as a refractive pattern, and wherein the lower surface of the third layer is not formed as a refractive pattern.

9. The backlight unit according to claim 8, wherein the light entering the second layer is condensed at a boundary surface between the first layer and the second layer in the direction perpendicular to the light-exiting surface.

10. The backlight unit according to claim 8, wherein the one or more ridges of the refractivity pattern have a first inclined side and a second rounded side.

11. The backlight unit according to claim 8, wherein the one or more ridges of the refractivity pattern have a first side with two or more inclined surfaces and a second rounded side.

12. The backlight unit according to claim 8, wherein the one or more ridges of the refractivity pattern have a first side with two or more inclined surfaces and a second side with two or more inclined surfaces.

13. A liquid crystal display (LCD) device comprising:
a light source emitting light;
an optical sheet disposed above a light guide plate; and
a LCD panel displaying an image using light received from the optical sheet,
wherein the optical sheet comprises:
a first layer having a larger refractivity than air;
a second layer having a larger refractivity than the first layer; and
a refractive pattern disposed at a boundary surface between the first layer and the second layer, the refractive pattern having one or more ridges that change a traveling path of light;
a third layer having a lower refractivity than the first layer; and
a diffusion layer that diffuses light on the second layer,
wherein the third layer is disposed at the lower surface of the first layer and facing the light guide plate,
wherein the upper surface and the lower surface of the third layer is formed in a plate shape,
wherein the optical sheet is operable to refract light from the light guide at least three times in a direction of the upper area of the optical sheet to a light-exiting surface,
wherein the diffusion layer includes a plurality of beads,
wherein the optical sheet includes the first, second and third layers for condensing light and the diffusion layer for diffusing light,
wherein a boundary surface between the first layer and the third layer is not formed as a refractive pattern, and
wherein the lower surface of the third layer is not formed as a refractive pattern.

14. The LCD device according to claim 13, wherein the light entering the second layer is condensed at a boundary surface between the first layer and the second layer in the direction perpendicular to the light-exiting surface.

15. The LCD device according to claim 13, wherein the one or more include a first inclined side and a second rounded side.

16. The LCD device according to claim 13, wherein the one or more ridges include a first side with two or more inclined surfaces and a second rounded side.

17. The LCD device according to claim 13, wherein the one or more ridges include a first side with two or more inclined surfaces and a second side with two or more inclined surfaces.

* * * * *